United States Patent Office

3,541,114
Patented Nov. 17, 1970

3,541,114
RECOVERY OF HYDROPHOBIC OXIRANE COMPOUNDS
Wallace E. Taylor, Corpus Christi, Tex., and Merle F. Sehnert, Palatine, Ill., assignors to Celanese Corporation, New York, N.Y., a corporation of Delaware
No Drawing. Filed Jan. 13, 1967, Ser. No. 608,978
Int. Cl. C07d 1/12
U.S. Cl. 260—348.5                          2 Claims

ABSTRACT OF THE DISCLOSURE

In a process for producing an epoxide by reacting an olefinic compound with an epoxidizing agent which forms a carboxylic acid as a by-product of the epoxidation reaction, the epoxide is separated from the carboxylic acid by dual-solvent extraction with two solvents, one being aqueous and the other being a water-immiscible liquid which is a solvent for the epoxide. When the epoxide is propylene oxide and the carboxylic acid is acetic acid, the aqueous solvent is advantageously an aqueous solution of a metal salt and the other solvent a hydrocarbon liquid comprising propylene.

The present invention relates to the separation of epoxy compounds from mixtures containing epoxy compounds together with other compounds with which epoxy compounds tend to react chemically. More particularly it relates to the separation of epoxy compounds of limited water solubility from carboxylic acids of high water solubility, especially lower carboxylic acids.

Epoxy compounds, of which a large number are of commercial importance in the manufacture of plastics, plasticizers, adhesives, and coatings, as well as being intermediates in the manufacture of other industrial chemicals such as vicinal glycols, can be manufactured by reacting an epoxidizing agent with an organic compound having in its molecule one or more points of olefinic unsaturation. For example, as disclosed in co-pending application Ser. No. 788,280, filed Jan. 22, 1959 and now Pat. No. 3,341,566, propylene can be reacted with peroxyacetic acid to form 1,2-propylene oxide. Epoxidation reactions can be conducted in various ways, but the crude product of the reaction typically contains the epoxy compound produced in the reaction together with various reaction by-products, diluents, and unreacted reaction feedstocks. Of these materials, there are frequently some which tend to react chemically with the epoxide moiety, and to the extent that such reaction takes place the epoxy compound is contaminated and the yields of the desired epoxy compound are reduced.

In considering the chemistry of epoxidation processes, it is convenient to employ peroxyacetic acid as the example of a typical epoxidizing agent. It may be fed to the epoxidation as such, or it may be formed in the reaction system by mixing therein acetic acid and hydrogen peroxide. Other epoxidizing agents are known, however, including peroxyformic acid, peroxypropionic acid, and higher homologues, even including peroxylauric acid and peroxy benzoic acid. Derivatives of peroxy acids, such as acetaldehyde monoperacetate, can also be used.

In the epoxidation of unsaturated compounds with a peracid or a peracid derivative to produce their epoxy derivatives, one mole of peracid reacts with each equivalent of olefinic unsaturation (theoretically) to form one equivalent of epoxide and one mole of by-product acid. In actual practice, somewwhat more than one mole of peracid may be consumed, and somewhat more than one mole or by-product acid may be formed, per equivalent of epoxide produced. Thus, the crude reaction product from an epoxidation reaction performed with peracid will contain at least one mole of by-product acid for every equivalent of epoxide moiety. Acetaldehyde monoperacetate reacts similarly, forming one mole of acetaldehyde as well as one mole of acetic acid as by-products.

The recovery of the epoxy product from the crude reaction products described above presents difficulties in that, at elevated temperatures or in the presence of certain catalysts (such as strong acids), the epoxide moiety tends to react with the by-product acid to form mono or diester derivatives of the epoxy compound. There may also be polymerization reactions of the epoxide moiety. All such reactions constitute a loss of epoxy product and acid co-product and also complicate the purification of the total reaction product.

Distillation has been employed to separate the epoxy compound from co-product acid in some instances, but this technique has not proved wholly satisfactory in a large number of instances and as a general rule much care has to be taken to avoid overheating such a reaction product in order to avoid or minimize the danger of product degradation which still exists. An alternative to distillation which has been employed in some instances is to wash the acid out of the product with water. This is satisfactory if the epoxide is strongly hydrophobic, but if it has appreciable water solubility, or if there are other materials present which are water-soluble and which it is not desired to accumulate into the water phase, simple washing of the reaction product with water is not satisfactory, because of undesired losses of non-acidic materials into the wash water. Likewise, if the epoxide not only has appreciable water solubility but is in fact very water soluble, e.g. completely miscible with water, simple water washing will effect very little separation at all. An invention relating to the recovery of such epoxides is disclosed in a co-pending application by Taylor and Thigpen, titled "Recovery of Hydrophilic Oxirane Compounds," Ser. No. 609,015 filed on the same date as the present application.

It is an object of this invention to provide a method of general applicability, for separating hydrophobic epoxy compounds from carboxylic acids while avoiding both the product degradation htat can sometimes occur in distillation methods and the losses of product and other materials that can sometimes occur in simple water-washing methods.

Other objects of this invention will be apparent from the following detailed description and claims.

In accordance with the present invention, a mixture containing an epoxy compound and other compounds (especially carboxylic acids) that tend to react with it is subjected to extraction with two substantially immiscible solvents, one aqueous and one one-aqueous, whereby the epoxy compound is recovered in a non-aqueous liquid phase, substantially free of other reactive compounds, while the other reactive compounds (e.g. carboxylic acids) are recovered in an aqueous liquid phase, substantially free of the epoxy compound. By utilizing solvent extraction, which does not require any use of high processing temperatures, all heating of the mixture before separation can be avoided. Furthermore, by utilizing extraction with two solvents one of which is aqueous and one non-aqueous, losses of epoxy compound and other non-acid organics into the aqueous phase are much less likely than if simple water washing is employed. The solvents must be substantially inert chemically, toward one another and toward the components of the mixture being separated, at normal extraction temperatures, i.e. at about 30° C.

When viewed in terms of its operational aspects, the invention has two embodiments. The first, which is generally applicable, is to feed the epoxidation product mixture to a dual-solvent extraction system wherein it is contacted with an aqueous solvent and with a non-aqueous solvent which is not miscible with the aqueous solvent. The carboxylic acid is recovered in the aqueous solvent, while the epoxy compound and other hydrophobic organics are recovered in the non-aqueous solvent. Once this separation has been effected, the compounds recovered in each solvent can be separated therefrom by conventional methods.

The second embodiment, which is essentially a special application of the first, is based on the discoverey that adding water-immiscible organophilic solvents to an epoxidation product mixture increases the tendency of certain epoxides and many other organics to concentrate preferentially into a non-aqueous phase as compared with an aqueous phase in contact with it. Conversely, it increases the tendency of hydrophilic carboxylic acids to partition into the aqueous phase. In practicing the second embodiment of the invention, a non-aqueous water-immiscible solvent is blended with the epoxidation product mixture to form a strongly hydrophobic mixture, which is then subjected to extraction with an aqueous solvent. The aqueous solvent removes the carboxylic acid from the mixture, leaving a non-aqeuous raffinate containing the epoxy compound. This amounts to a simplified dual-solvent extraction process. The non-aqueous solvent employed may be a separately-added material or it may be simply a large excess of material already being handled in the process. It may be, for example, simply an excess quantity of a hydrophobic compound the epoxy derivative of which is the epoxy compound in the epoxidation reaction product.

In practicing both embodiments of this invention, the aqueous solvent can advantageously be, in place of pure water, an aqeuous solution of a metal salt. It has been found that the use of such salt solutions is particularly helpful when the epoxy compounds, or other organics it is desired to accumulate into the non-aqueous solvent, have appreciable solubility in pure water. In such instances, the inclusion of a dissolved metal salt in the aqueous solvent tends to drive the epoxides and other organics (such as esters) into the organic phase and thereby improve the efficiency of the process. When a metal salt is to be used in this manner, it is convenient to employ a salt of the carboxylic acid which is already present in the epoxidation product mixture, for example sodium acetate, calcium acetate, or potassium acetate when the epoxidation product mixture contains acetic acid or the corresponding propionates when the mixture contains propionic acid. An added advantage can be obtained by using as the metal salt a salt of a strong base and the carboxylic acid being separated, for example sodium acetate if the acid being separated is acetic acid. Such salts have a buffering action and, when present in the extraction system, prevent the development of excessively high acidity which may catalyze undesired esterification and hydrolysis reactions of the epoxy product. While buffering salts are preferred, for the reason just named, substantially any metal salt can be used which has a high degree of solubility (i.e. about 5 about weight percent or more) in an aqueous solution of the carboxylic acid being separated. Generally applicable, in addition to salts of the acid being separated, are all water-soluble sulfates, borates, phosphates, nitrates, oxalates, etc. Halides can be employed if precautions are taken to guard against the corrosion which attacks equipment made of certain metals (e.g. stainless steel) in the presence of halides.

By way of illustration, but without limiting its use to these cases alone, the invention can be described in connection with the treatment of mixtures comprising the following reaction product combinations of epoxy compound and co-product acid;

(1) 1,2-propylene oxide with acetic acid
(2) 1,2-epoxy $C_{14}$ alkane with acetic acid (The alkene precursor is commercially designated $C_{14}$ but is actually a mixture of $C_{14}$, $C_{12}$, $C_{14}$, and $C_{16}$ alkenes with $C_{14}$ predominating.)

In manufacturing 1,2-propylene oxide, peroxyacetic acid, dissolved in a suitable solvent, is reacted in the liquid phase with a stoichiometric excess of propylene. The propylene may be of commercial quality and therefore may generally have mixed with it 5 percent or more of propane, which is inert in the reaction. Any of several materials may be used as reaction solvents for the peroxyacetic acid, including methyl acetate, ethyl acetate, acetic acid, acetone, methylal, etc. Depending upon the peroxyacetic acid solvent employed, the purity of the propylene, and the stoichiometric excess of propylene employed, various compositions of reactor product are possible, including the following, all compositions being weight percent and not including minor reaction by-products:

| Component | Mixture designation | | | |
|---|---|---|---|---|
| | A | B | C | D |
| 1,2-propylene oxide | 14.1 | 20.0 | 20.0 | 5.4 |
| Acetic acid | 16.0 | 22.8 | 60.0 | 16.2 |
| Propylene and propane | 43.6 | 20.0 | 20.0 | 79.4 |
| Methyl acetate | 26.2 | 37.2 | | |

It has been discovered that the mixture listed above can all be separated into one fraction containing the propylene oxide and another containing the acetic acid, by utilizing a hydrocarbon to dissolve the propylene oxide and an aqueous medium to dissolve the acetic acid. As the aqueous medium, it has been found that an aqueous metal salt solution is even more effective than water lone, since propylene oxide has itself substantial solubility in pure water. A preferred aqueous medium (solvent for the acetic acid) in this system is aqueous sodium acetate, advantageously about 20 weight percent concentration, in which propylene oxide has been found to be comparatively insoluble. Sodium acetate has the additional advantage of having a buffering action, thereby minimizing hydrolysis and esterification reactions of the propylene oxide in the presence of the water and acetic acid.

Taking a product similar to Mixture A above, but substituting pentane for the propane-propylene in order to facilitate working at atmospheric pressure while making the test, the following distribution between phases has been found to result if the mixture is shaken with an equal weight of 20 weight percent sodium acetate and then allowed to separate into two phases at 15° C.

| Component | Concentration, weight percent in— | | |
|---|---|---|---|
| | Non-aqueous phase | Aqueous phase | Distribution coefficient [1] |
| 1,2-propylene oxide | 13.3 | 3.6 | 3.7 |
| Acetic acid | 2.1 | 9.8 | 0.2 |
| Methyl acetate | 27.5 | 8.3 | 3.3 |

[1] Concentration in the epoxide-rich phase divided by concentration in the epoxide-lean phase.

The amenablity of this system to separating the propylene oxide and acetic acid by solvent extraction is indicated quantitatively by a "distribution ratio," defined as the quotient obtained by dividing the distribution coefficient for the epoxy compound (here propylene oxide) by the distribution coefficient for the carboxylic acid (here acetic acid). When this ratio is greater than unity separation by solvent extraction is possible and when the ratio is about ten or more the separation is quite feasible. In this case, the ratio is 3.7:0.2, or 18.5.

Other systems similar to the above, including two having ethyl acetate instead of methyl acetate, have been found to give the following phase distributions at 25° C. when contacted with sodium acetate solution in the same manner as above:

| Case | Component | Concentration, weight percent in— | | Distribution coefficient |
|---|---|---|---|---|
| | | Hydrocarbon phase | Aqueous phase | |
| 1 | 1,2-Propylene oxide | 8.4 | 2.3 | 3.7 |
| | Acetic acid | 0.9 | 6.5 | 0.1 |
| | Methyl acetate | 16.4 | 4.5 | 3.6 |
| 2 | 1,2-Propylene oxide | 11.7 | 3.7 | 3.2 |
| | Acetic acid | 2.4 | 10.7 | 0.2 |
| | Ethyl acetate | 28.7 | 2.8 | 10.2 |
| 3 | 1,2-Propylene oxide | 7.2 | 2.5 | 2.9 |
| | Acetic acid | 0.8 | 7.4 | 0.1 |
| | Ethyl acetate | 17.5 | 1.8 | 10.0 |

The mixtures described above, and a similar mixture made using pentane instead of propylene, have been found to distribute as follows when contacted with sodium acetate solution at 25° C. in the manner described above.

| | Hydrocarbon | |
|---|---|---|
| | Propylene | Pentane |
| Charge, weight percent: | | |
|   1,2-propylene oxide | 5.4 | 5.4 |
|   Acetic acid | 16.2 | 16.2 |
|   Hydrocarbon | 79.4 | 79.4 |
| Hydrocarbon phase, weight percent: | | |
|   1,2-propylene oxide | 4.0 | 4.5 |
|   Acetic acid | 0.4 | 0.4 |
| Aqueous phase, weight percent: | | |
|   1,2-propylene oxide | 1.7 | 1.6 |
|   Acetic acid | 13.3 | 16.3 |
| Distribution coefficients, weight percent: | | |
|   1,2-propylene oxide | 2.3 | 2.9 |
|   Acetic acid | 0.03 | 0.2 |

These data indicate both the applicability of the method to Mixture D and the similarity of action of propylene and pentane as solvents. It is further indicated that, while propylene is quite suitable as a solvent for recovering propylene oxide from this mixture, pentane is better. However, an extraction system using propylene or a propane-propylene mixture as the non-aqueous solvent and a sodium acetate solution as the aqueous solvent eliminates the need for adding another component (pentane) to the system. The use of propylene simplifies the solvent-handling operation where propylene oxide is the epoxide to be recovered since propylene is already present as a reactant in the epoxidation reaction and is to be recovered and re-processed in any event.

Another example of this invention resides in the separation of the epoxy compound from the carboxylic acid contained in a mixture comprising the following:

MIXTURE E

Component: Wt. percent
  1,2-epoxy derivative of 1,2-"$C_{14}$" alkene actually a mixture of $C_{10}$ to $C_{16}$ 1,2-alkenes ____ 34.3
  Acetic acid _____ 19.0
  Ethyl acetate _____ 46.7

In this case, the epoxy compound (the 14-carbon atom epoxy alkane) has been found to be not soluble in water to any great extent, so that water alone (without a dissolved salt) can be used as solvent for the acetic acid, although a dissolved salt will assist in partitioning ethyl acetate to the non-aqueous phase, and if a buffering salt is used it will also minimize any hydrolysis of the epoxy compound.

For Mixture E above, phase distribution relations were determined as tabulated below for systems in which the mixture was added to varying amounts of water, with and without a quantity of pentane volumetrically equal to the amount of Mixture E employed, the entire mixture in each case then being thoroughly mixed together and allowed to settle into two liquid phases at 25° C. The epoxy compound partitioned preferentially into the non-aqueous phase, and distribution coefficients were found to be as tabulated below:

DISTRIBUTION COEFFICIENTS

| Wt. ratio, water to acetic acid | Acetic acid | | Alkylene oxide | | Ethyl acetate | |
|---|---|---|---|---|---|---|
| | Without pentane | With pentane | Without pentane | With pentane | Without pentane | With pentane |
| 0.3 | | 0.17 | | >100 | | 1.57 |
| 0.5 | 0.51 | 0.20 | 16 | >100 | 1.55 | 1.71 |
| 1.0 | 0.47 | 0.26 | >100 | >100 | 2.54 | 2.31 |
| 1.5 | 0.44 | 0.15 | >100 | >100 | 3.47 | 3.22 |
| 2.0 | 0.47 | | >100 | | 4.34 | |
| 2.5 | 0.36 | | >100 | | 4.85 | |

In this system a practicable degree of separation of acetic acid from epoxy compound could be obtained by extracting acetic acid out of the product mixture with water alone, since the epoxy compound partitions strongly to the non-aqueous phase even in the absence of the pentane. The use of a second, non-aqueous, solvent (e.g. pentane) does, however, improve the distribution cofficients of both epoxy compound and acetic acid, so that use of the dual-solvent system improves the efficiency of separation. The inclusion of a metal salt, such as sodium acetate, in the aqueous solvent will also increase the partition of ethyl acetate into the non-aqueous phase, which is desirable since ethyl acetate can be recovered from one phase more easily than from two.

The phase distribution relationships just described, and the examples which are to follow, deal with systems in which the epoxidations have been performed with a peroxy acid (peroxyacetic acid). If a peroxy acid derivative, such as acetaldehyde monoperacetate, is employed, the situation is quite similar. The by-product acid (e.g. acetic acid) formed in the reaction distributes between the aqueous and non-aqueous phases in the manner just described, and the remaining by-product moiety (e.g. acetaldehyde) distributes between the two phases in a manner dictated by its own solubility characteristics. (Acetaldehyde will distribute largely into the aqueous phase.) However this remaining moiety distributes itself, it can be recovered by conventional methods, and the object of this invention, the separation of epoxide from carboxylic acid, has been accomplished.

The foregoing discussion deals largely with the applicability of the invention to systems in which the epoxide is an epoxy derivative of an olefinic linear or branched hydrocarbon having more than two carbon atoms, in which systems the utility of the invention improves with increasing molecular weight of the hydrocarbons (e.g. butylene oxides are easier to process than propylene oxides, and hexylene oxides easier than butyleneoxides etc.). It is applicable, however, to other epoxy compounds, for example epoxy cycloalkanes, epoxy esters, epoxy ethers (e.g. epoxidized allyl ethers of polyols), epichlorohydrin, epoxy derivatives of aliphatic carboxylic acids of more than three carbon atoms, epoxidized oils, and, in general, all epoxides the water solubility of which is not substantially greater than about 75 grams per 100 ml. of water at 30° C.

The carboxylic acids which can be handled by the process of the invention include formic, acetic, propionic, butyric, and in general all carboxylic acids which are of high water solubility, i.e. carboxylic acids the water solubility of which is greater than about 75 grams per 100 ml. of water at 30° C. With unsubstituted monocarboxylic acids this implies acids of less than five carbon atoms.

The non-aqueous solvent employed in practicing the invention can be any liquid which is not miscible with water, does not readily react with epoxy compounds, water, and carboxylic acids, and is an effective solvent for epoxy compounds and non-polar organics. Hydrocarbon liquids, such as propane, propylene, butane, pentanes, hexanes, heptanes, cyclic homologues of the foregoing, toluene, xylenes, etc., are preferred for many epoxy reaction products, as being inexpensive and readily available but other materials can be used including ethers, chlorinated solvents, high molecular weight esters, high-molecular weight carboxylic acids, glycerides, etc. In many cases, the non-aqueous solvent can adventageously comprise the unsaturated compound used as a raw material in the epoxidation reaction; for example, it can be propylene when the epoxidation product is propylene oxide or butylene when the product is a butylene oxide.

Multiple-stage countercurrent extractions are most efficient in practicing this invention, but with a feedstock like Mixture E described above, the distribution ratio is so high that a substantial degree of separation can be obtained in a one-stage mixing-settling operation. (A multiple-stage countercurrent extraction is still preferred here, however, to ensure the accumulation of the ethyl acetate into the non-aqueous phase, since it is a valuable material which should be recovered and its recovery from only one phase is easier and requires less equipment than recovery from two phases.) With feedstocks like the propylene oxide system described above, multiple-stage countercurrent extraction is preferred. The equipment employed is not a critical factor. For example, packed columns or plate-type columns can be used, or extractors of the type in which agitation zones and stilling-disengaging zones are arranged alternately one above the other, or agitated vessels alternating with settling-decanting vessels. Sufficient pressure must be maintained to prevent vaporization of volatile materials that may be present (e.g. propylene). Temperature should be kept reasonable low until separation has been completed, to prevent the degradation reactions the avoidance of which is an object of this invention. In general, the temperature of the extraction should be kept below about 40° C., although this does not represent a sharp break-point. Progressively higher temperatures result in a progressive increase in the rate of the by-product-forming reactions. In the case of propylene oxide-acetic acid equimolar mixtures, for instance, the reaction of propylene oxide to form by-products has been found to be over five times as fast at 50° C. as at 30° C.

EXAMPLE I

At a rate of 1660 grams per hour, a mixture similar to Mixture E described above was fed to the center of a 20-stage "York-Scheibel" column two inches in diameter maintained at 25° C. and 0 pounds per square inch gauge measured at the top. Water, at a rate corresponding to 3.3 parts by weight of water per part of acetic acid in the feed mixture, was fed to the top of the column while 930 grams per hour of pentane were fed to the bottom of the column. A non-aqueous phase withdrawn from the top of the column was found to contain substantially all of the epoxide initially fed, together with about 89% of the ethyl acetate and only 0.6% of the acetic acid fed. An aqueous phase withdrawn from the bottom of the column contained about 99.4% of the acetic acid fed and about 11% of the ethyl acetate. The ethyl acetate in the aqueous phase was recoverable therefrom by distillation.

EXAMPLE II

An epoxidation product mixture containing 14,460 pounds per hour of acetic acid, 2,713 pounds per hour of propylene, 6,620 pounds per hour of propane, 45,850 pounds per hour of ethyl acetate, and 11,420 pounds per hour of propylene oxide is fed to the 12th plate from the bottom in a perforated-plate extraction tower 8 feet in diameter containing 25 trays, maintained at 20° C. and 175 pounds per square inch gauge measured at the top. To the bottom of the column are fed 123,167 pounds per hour of a mixture containing 63% propylene with the remained comprising propane, and to the top of the column are fed 42,000 pounds per hour of a 25% solution of sodium acetate in water. A non-aqueous phase withdrawn from the top of the column contains 95% of the propylene oxide, 95% of the ethyl acetate, and 5% of the acetic acid fed to the column. An aqueous phase withdrawn from the bottom of the column contains 5% of the propylene oxide, 5% of the ethyl acetate, and 95% of the acetic acid originally fed. Of the propylene oxide withdrawn in the non-aqueous phase, 99% is subsequently recovered substantially pure in a distillation tower. Of the acetic acid withdrawn in the aqueous phase, 99% is subsequently recovered substantially pure in a conventional solvent extraction-distillation operation of the type customarily employed in recovering acetic acid from aqueous solutions.

It is to be understood that the foregoing detailed description is merely given by way of illustration and that many variations may be made therein without departing from the spirit of our invention.

The embodiments of the invention in which an exclusive property or privilege is claimed are defined as follows:

1. In the process of producing propylene oxide by reaction of propylene with peracetic acid, wherein the reaction product is a liquid consisting essentially of 1,2-propylene oxide, acetic acid, at least one member of the group consisting of methyl acetate, ethyl acetate, acetone, and methylal and at least one member of the group consisting of propylene and mixtures of propylene with propane, the improvement which comprises:

separating said 1,2-propylene oxide from said acetic acid counter-current dual-solvent extraction at a temperature not exceeding about 40° C. with two liquid extractants, one of which is an aqueous solvent which is a member of the group consisting of water and aqueous solutions of sodium acetate and the other of which is a hydrocarbon solvent consisting essentially of propylene and propane; said acetic acid being recovered in said aqueous solvent and said 1,2-propylene oxide being recovered in said hydrocarbon solvent.

2. The process of claim 1 wherein said aqueous solvent is an aqueous solution of sodium acetate.

References Cited

UNITED STATES PATENTS

| 2,845,442 | 7/1958 | Pachaly et al. | 260—348.5 |
| 3,002,004 | 9/1961 | Beavers et al. | 260—348.5 |
| 3,042,686 | 7/1962 | O'Brien et al. | 260—348.5 |
| 3,222,381 | 12/1965 | Iacoviello et al. | 260—348.5 |
| 3,448,125 | 6/1969 | Beavers et al. | 260—348.5 |

FOREIGN PATENTS 794,373   4/1958   Great Britain.

NORMA S. MILESTONE, Primary Examiner

U.S. Cl. X.R.

260—348

UNITED STATES PATENT OFFICE
CERTIFICATE OF CORRECTION

Patent No. 3,541,114　　　　　　　　　　Dated　November 17, 1970

Inventor(s)　　Wallace E. Taylor et al.

It is certified that error appears in the above-identified patent and that said Letters Patent are hereby corrected as shown below:

Column 2, line 57, "one-aqueous" should read -- non-aqueous --. Column 4, line 7, "of $C_{14}$" should read -- of $C_{10}$ --; line "lone" should read -- alone --. Column 5, line 39, "fon" should read -- for --. Column 6, in the first sub-heading of the table "wkter" should read -- water --; line 20, "cofficients" should read -- coefficients --. Column 7, line 11, "inventon" should read -- invention --; line 32, "recations" should read -- reactions --. Column 8, line 7, "remained" should read -- remainder --.

Signed and sealed this 1st day of June 1971.

(SEAL)
Attest:

EDWARD M. FLETCHER, JR.　　　　　　　WILLIAM E. SCHUYLER,
Attesting Officer　　　　　　　　　　Commissioner of Patents